United States Patent
Neumann et al.

(10) Patent No.: US 9,174,564 B2
(45) Date of Patent: Nov. 3, 2015

(54) INTERCHANGEABLE STRAP CONNECTORS

(75) Inventors: Timothy Neumann, Las Vegas, NV (US); Herb Yeager, Orange, CA (US)

(73) Assignee: Snap-Loc Cargo Control Systems, LLC, Las Vegas, NV (US)

(*) Notice: Subject to any disclaimer, the term of this patent is extended or adjusted under 35 U.S.C. 154(b) by 79 days.

(21) Appl. No.: 13/194,776

(22) Filed: Jul. 29, 2011

(65) Prior Publication Data

US 2012/0023711 A1 Feb. 2, 2012

Related U.S. Application Data

(60) Provisional application No. 61/369,702, filed on Jul. 31, 2010.

(51) Int. Cl.
F16B 45/00 (2006.01)
B60P 7/08 (2006.01)

(52) U.S. Cl.
CPC .............. B60P 7/0823 (2013.01); F16B 45/00 (2013.01); *Y10T 24/3484* (2015.01); *Y10T 24/4755* (2015.01)

(58) Field of Classification Search
CPC .... A44B 11/28; A44B 13/0029; F16B 45/00; F16G 15/04; A44C 5/2071
USPC .............. 24/369, 265 H, 598.4, 598.5, 600.9, 24/598.7, 265 AI; 294/82.2, 82.19
See application file for complete search history.

(56) References Cited

U.S. PATENT DOCUMENTS

| | | | | |
|---|---|---|---|---|
| 184,211 A * | 11/1876 | Jones | ............................ | 24/598.5 |
| 583,564 A * | 6/1897 | Benford | ............................ | 24/301 |
| 1,859,657 A * | 5/1932 | Cunnington | .................. | 152/221 |
| 2,033,286 A * | 3/1936 | Hoff | .................................. | 59/85 |
| 2,169,298 A * | 8/1939 | Sorensen | ...................... | 182/142 |
| 2,539,997 A | 1/1951 | Graves | | |
| 2,856,663 A * | 10/1958 | Elsner | ............................. | 24/182 |
| 2,919,946 A | 1/1960 | Miener | | |
| 3,079,657 A * | 3/1963 | Russell | ............................ | 24/373 |
| 3,237,396 A * | 3/1966 | Brugnola | ........................ | 59/85 |
| 3,913,185 A * | 10/1975 | James | .......................... | 24/697.1 |
| 4,011,715 A * | 3/1977 | Graetz | .............................. | 59/85 |
| 5,063,641 A | 11/1991 | Chuan | | |
| 5,402,557 A | 4/1995 | Dalen | | |
| 5,423,644 A | 6/1995 | First, Sr. | | |
| 5,448,805 A * | 9/1995 | Allen et al. | ....................... | 24/300 |
| 5,551,738 A * | 9/1996 | Thorlton | ........................ | 292/262 |
| 5,738,259 A | 4/1998 | Allen | | |
| 5,832,572 A * | 11/1998 | Norrby | ......................... | 24/600.9 |
| 6,081,975 A * | 7/2000 | Norrby | ............................ | 24/369 |
| 6,637,007 B1 | 10/2003 | Bots | | |
| 6,755,383 B2 | 6/2004 | Davis | | |
| 2003/0101546 A1 * | 6/2003 | Toye | ............................ | 24/265 H |

* cited by examiner

*Primary Examiner* — Robert J Sandy
*Assistant Examiner* — Michael Lee
(74) *Attorney, Agent, or Firm* — Avyno Law P.C.

(57) ABSTRACT

Hooks are provided which permit the removable attachment to loop members of tie-downs straps of the type used to tie-down cargo. In one example, a modified J-hook is provided where the two hook that form the hook members on the end of the J-hook are separated from one another and create a gap between the members to permit the threading of the hook to loop member of the tie-down straps. In another example, a modified ring-hook is provided with overlapping end members for removable receiving the loop members of the tie-down straps.

3 Claims, 4 Drawing Sheets

INTERCHANGEABLE STRAP CONNECTORS

RELATED APPLICATIONS

This application claims priority under 35 U.S.C. §119(e) of U.S. Provisional Patent Application No. 61/369,702 filed on Jul. 31, 2010 and titled Interchangeable Strap Connectors, which application is incorporated in its entirety by reference in this application.

BACKGROUND

1. Field of the Invention

This invention relates to strap connectors used in connection with tie-down straps, and in particular, to hooks that permit the removable connectivity to a variety of tie-down straps for use in hauling heaving equipment and supplies.

2. Related Art

Tie-down straps generally have hooks secured at opposing end of the straps, and often times, have hooks secured along the length of the straps. The hooks are generally of the following types: S-hooks, Double J-hooks, Ring Hooks and Snap Hooks. S-hooks are generally rubber coated steel hooks formed in the shape of an S and having a hook on one end and a loop on the other end. The loop end is permanently affixed to the strap. J-hooks are generally rubber coated steel hooks formed in the shape of a J and having a triangular loop at one end with double hooks extending upward from the triangular loop end. Ring hooks are simply generally circular shaped hooks. Snap-hooks generally include a pivotal hook keeper that retains another hook (e.g., stationary hook) by depressing the keeper inward to open the snap hook and allow the snap hook to engage another hook member. The keeper retracts to a closed positioned once released from depression to permit the disengagement of the other hook member.

Currently available hooks are not removable from the tie-down strap once the straps looks are sewn. A need therefore exists for removable hook members that provide more versatility and that reduce manufacturing and labor costs associated with the use of tie-down straps. Making the straps removable increases versatility by allowing a variety of styles of hooks to be attached to a variety of positions on the tie-down straps.

For example, with current J-hooks, the double hook members are positioned directly next to one another to create a single hook. Similarly, general ring hooks are typically constructed from a single piece of steel formed in the shape of a ring, triangle, rectangle or other similar shape and welded together at its ends Eliminating welds from the various styles of hooks reduces manufacturing costs. Stitching the strap ends without the hooks also reduces labor time in the manufacturing of the straps, which results in an overall reduction in costs.

A further need therefore exists for hook members that are removable and therefore are not required during the stitching of the strap loops. Further, a need exists for hook member that may be constructed without the need for any welding.

SUMMARY

Hooks are provided the permit the removable attachment to loop members of tie-downs straps of the type used to tie-down cargo. In one example, a modified J-hook is provided where the two hook that form the hook members on the end of the J-hook are separated from one another and create a gap between the members to permit the threading of the hook to loop member of the tie-down straps. In another example, a modified ring-hook is provided with overlapping end members for removable receiving the loop members of the tie-down straps.

The modified hook members of the invention allow a stitched loop at one end or along a tie-down strap to be slipped around one side of a hook and pushed into position thus binding of the hook to the strap and allowing the replacement of the hook with a variety of shapes, sizes and styles of hooks.

The versatility of replaceable hooks on tie-down straps allows product users to switch hooks on the straps to best suit the application. For example, a different size or style of hook will work better on various applications, on various trailers, or attaching to another strap to extend length.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
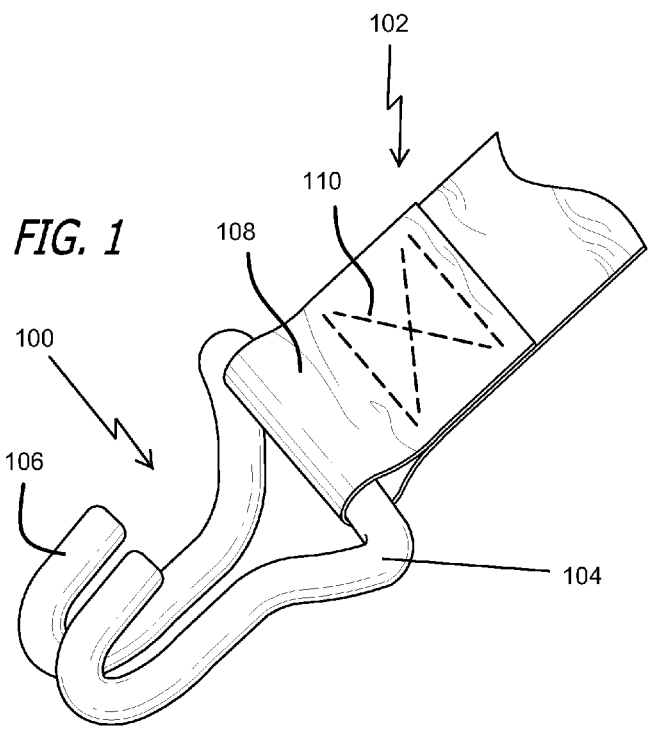
FIG. 1 illustrates a tie-down strap having a modified J-hook of the present invention attached to the strap.

FIG. 1 illustrates a tie-down strap 102 having a modified J-hook 100 of the present invention attached to the strap 102. As illustrated in FIG. 1, the tie-down strap 102 includes an end portion 110 of the tie-down strap 102 folded over and sewed to the tie-down strap 102 to create a strap loop 108 for the receipt of a hook. The J-hook 100 includes a retaining bar 104 for threading through the hoop 108 and retaining the tie-down strap 102 to the modified J-hook 100. To utilize the tie-down strap 102 to maintain cargo, the J-hook 100 further includes hook members 106 for engaging or tying down the tie-down straps 102 to track hooks or other hook members. FIG. 1 illustrates the J-hook 100 in the assembled state on the strap loop 108 of the tie-down strap 102.

Figure 2:
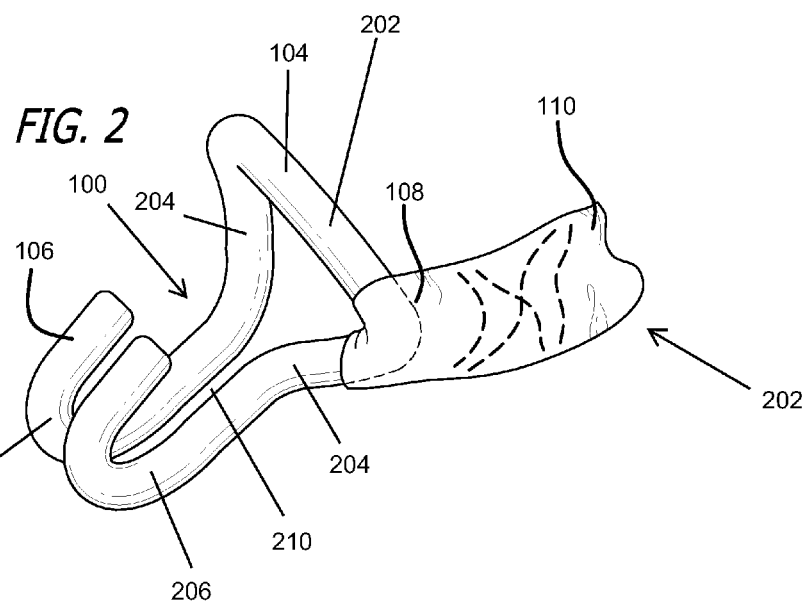
FIG. 2 illustrates one example of the tie-down strap being threaded onto the modified J-hook of the present invention.

FIG. 2 illustrates one example of the tie-down strap 102 being removed from the modified J-hook 100 of the present invention. As illustrated in FIG. 1, the J-hook 100 is designed to mate with the strap loop 108 of the tie-down strap 102. The modified J-hook 100 includes a generally triangular member 202 in which the tie-down strap 102 is retained at the strap loop 108 by the retaining bar 104. The generally triangular member 202 further includes two opposing sides 204 that converge into and form a first and second hook 206, 208. The first and second hooks 206, 208 are separated slightly from one another to form a gap 210 between the first and second hooks 206, 208 for the receipt of the strap loop 108 of the tie-down strap 102. As illustrated in FIG. 2, to remove the J-hook 100 from the strap loop 108, one pushes the tie-down strap 102 around and along one of the opposing sides 204 of the J-hook 100 until the strap loop 108 reaches the free end of either the first or second hook 206, 208.

Similarly, in operation, to put the J-hook 100 on the tie-down strap 102, the strap loop 108 of the tie-down strap 102 can be threaded on either the first or second hook 206 or 208. The strap loop 108 is then pushed along one of the opposing sides 204 until it is positioned along the retaining bar 104 of the J-hook 100.

Figure 3:
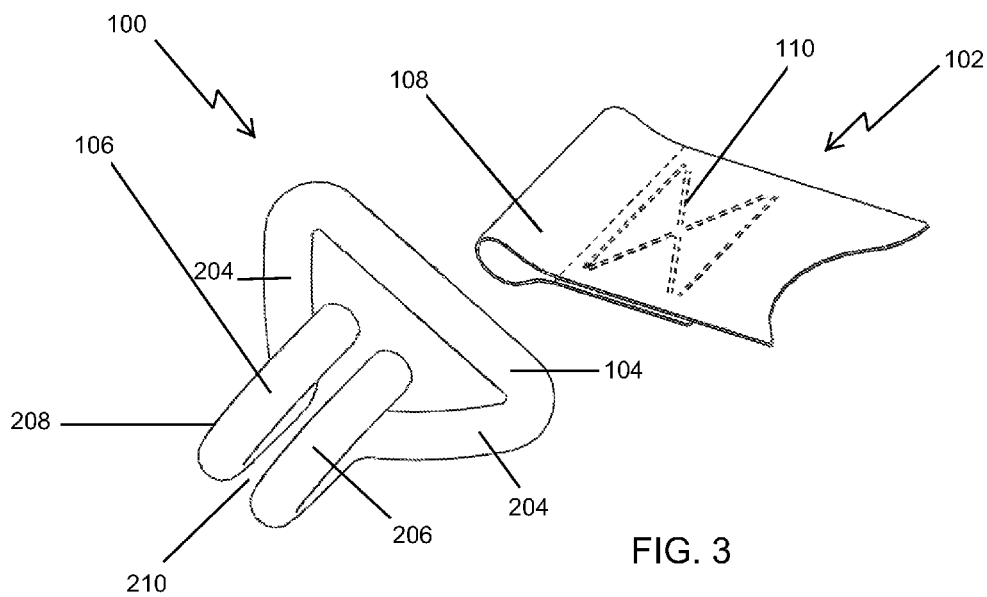
FIG. 3 illustrates the modified J-hook separated from the tie-down strap member.

FIG. 3 illustrates the modified J-hook 100 removed from the tie-down strap 102. The removable aspect of the J-hook 100 is made possible by the gap or separation 210 between the first and second hooks 206 and 208. This permits the ease of removal of the strap loop 108 of the tie-down strap 102 from the J-hook 100. As illustrated in FIG. 2, the loop-end 108 of the strap member 102 may be threaded onto either the first or second hook 206 or 208 and then moved or pushed along the opposing sides 204 of the triangular member 202 until the strap loop 108 has the retaining bar 104 of the triangular member 202 extending completely through the strap loop 108. As seen in FIG. 3, the shape of the J-hook 100 is designed to mate with the strap loop 108. More particularly, the J-hook is sized such that the retaining bar 104 is slightly longer than the length of the strap loop 108 such that the strap loop 108, when assembled on the J-hook 100, fits across the retaining bar 104.

Figure 4:
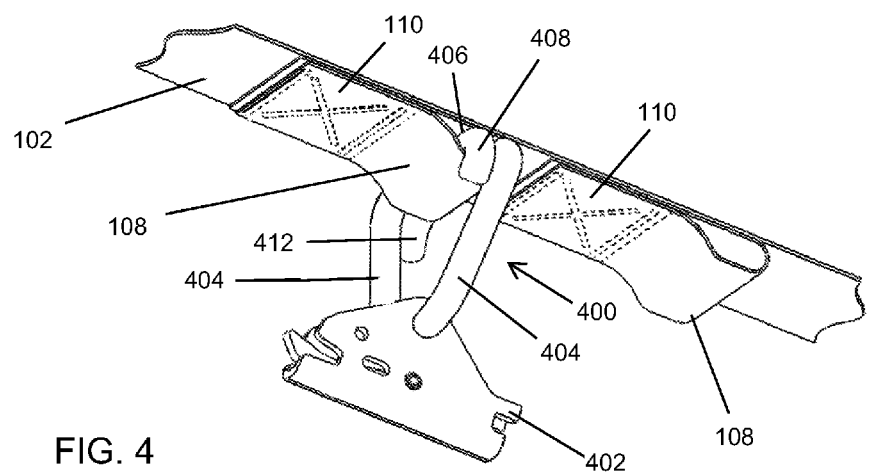
FIG. 4 illustrates another example of an implementation of a modified ring hook to permit the threading of a strap member onto the hook.

FIG. 4 illustrates another example of an implementation of a modified ring hook 400 to permit the threading of a tie-down strap 102 onto the ring hook 400. As illustrated in FIG. 4, a releasable buckle 402 may be provided with a ring hook 400 attached. The ring hook 400 may be generally triangular or circular in shape and may include two opposing sides 404 converging at one end to create a narrow loop end 420 for being retained within the release buckle 402. The two opposing sides 404 at the end opposite the narrow loop end 420 terminate at respective first and second overlapping end members 406 and 410. The ring hook 400 of the present invention may be threaded through the strap loops 108 similar to those shown on tie-down strap 102 in FIGS. 1-3 or may be utilized on strap loops 108 located along a tie-down strap 102. Both first and second overlapping end members 406 and 410 may include hook ends 408 and 412, respectively, to permit the tie-down strap 102 from easily sliding along the ring hook 400 once fully assembled.

Figure 5:
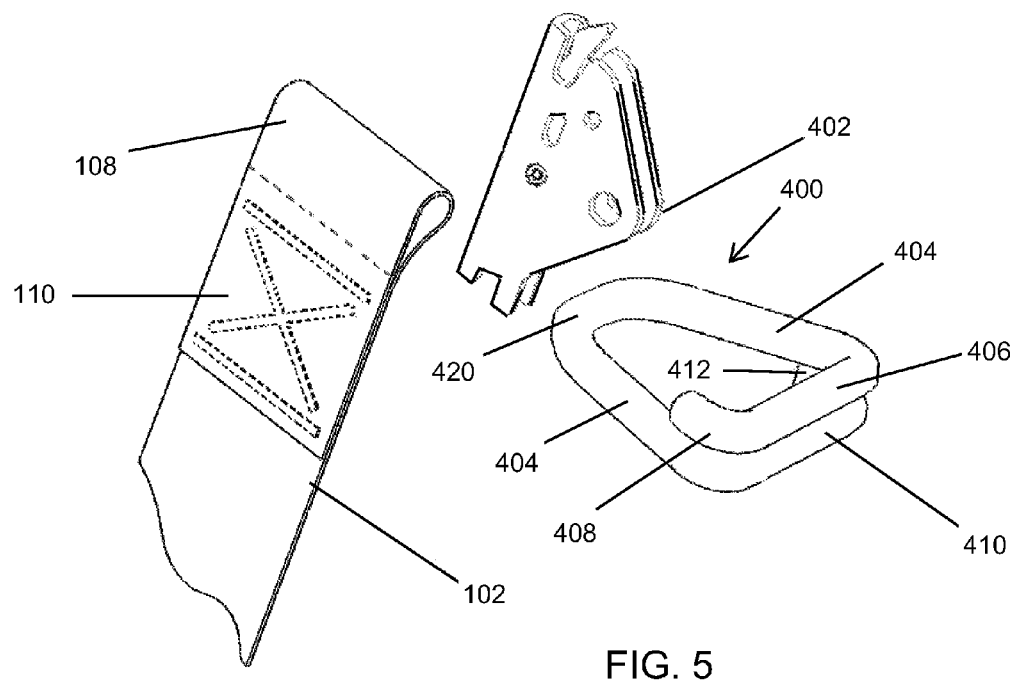
FIG. 5 illustrates the releasable buckle separated from the modified ring hook and the tie-down strap.

FIG. 5 illustrates a releasable buckle 402 removed from the modified ring hook 400 and the tie-down strap 102. As illustrated in FIG. 5, the ring hook 400 may include a narrow loop end 420 for engagement with an opening in the releasable buckle 402. The ring hook 400 may further include two opposing side members 404 and first and second overlapping end members 406 and 410 each having opposing end hooks 408 and 412. As illustrated the overlapping end members 406 and 412 are positioned one on top of the other. In FIG. 5, the first overlapping end member 406 is positioned directly atop the second overlapping end member 410.

Figure 6:
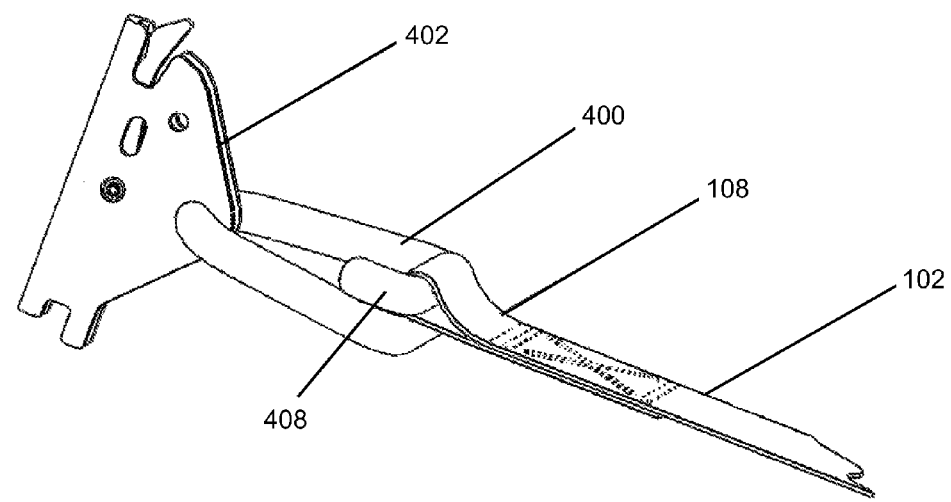
FIG. 6 illustrates one example of the tie-down strap being threaded to the ring hook.

FIG. 6 illustrates one example of the tie-down strap 102 being threaded to the ring hook 400. As illustrated in FIG. 6, the ring hook 400 is engaged with the releasable buckle 402 at the narrow loop end 420 of the ring hook 400. The strap loop 108 of the tie-down strap 102 may then be threaded along either the first or second overlapping member 406 or 410 of the ring hook 400. By pushing the strap loop 108 of the tie-down strap 102 over one of the hook ends 408, 412 of the first or second overlapping end member 406, 410 respectively, the strap loop 408 may be threaded onto the ring hook 400.

Figure 7:
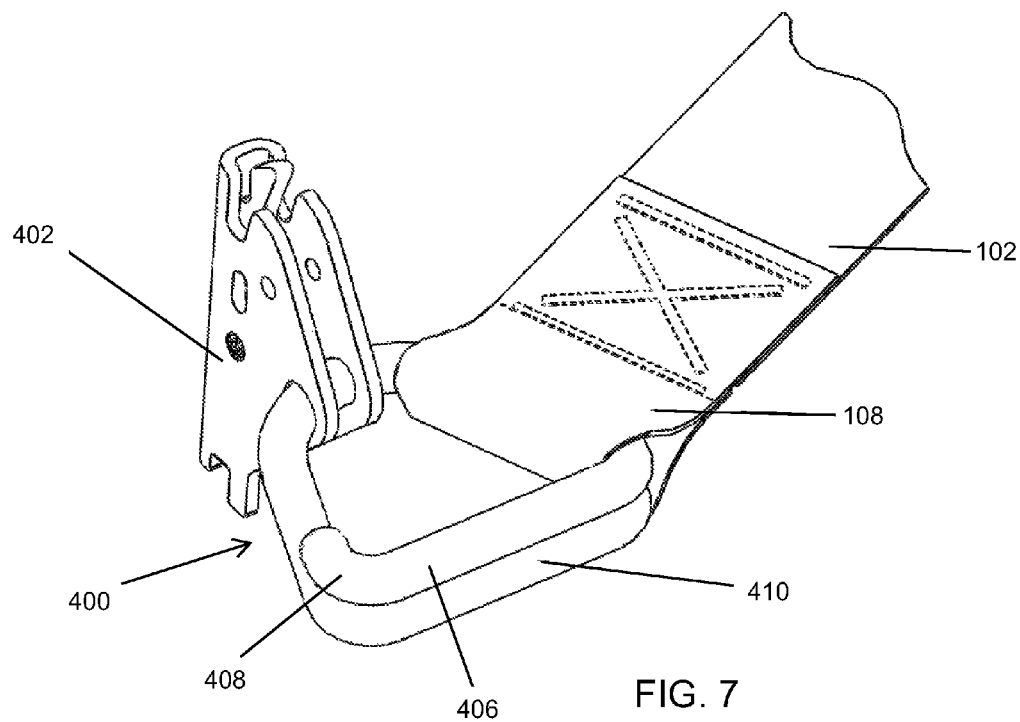
FIG. 7 illustrates an intermediary position of the tie-down member being threaded to the modified ring member.

FIG. 7 illustrates an intermediary position of the tie-down strap 102 being threaded to the ring member 400. As illustrated in FIG. 7, to thread the strap loop 108 of the tie-down strap 102 to the ring member 400 the strap loop 108 must be pushed past the hook end 412 (as illustrated in FIG. 7) of second overlapping end member 410 and along the opposing side 404 of the ring hook 400. Once the strap loop 108 is past the hook end 412 of the overlapping member 410, the strap loop 108 may then be reversed such that the hook end 412 of the overlapping member 410 is positioned within the strap loop 408 of the tie-down member 102.

Figure 8:
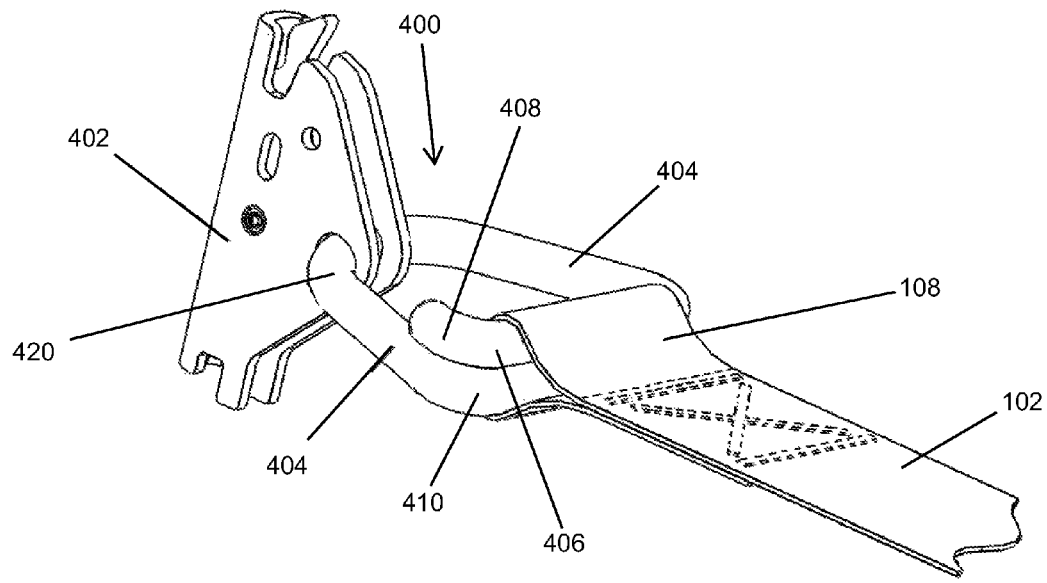
FIG. 8 illustrates the engagement of the tie-down member with the modified ring hook of the present invention.

FIG. 8 illustrates the engagement of the tie-down strap 102 with the ring hook 400 of the present invention. As illustrated in FIG. 8, once the strap loop 108 is in receipt of both the first and second overlapping members 406 and 408, the strap loop 108 is fully assembled on the ring hook 400 and is retained across the first and second overlapping end members 406, 410 by the opposing hook ends 408 and 412.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A tie down strapping system comprising:
    a tie down strap having a loop member;
    a hook for removably engaging a loop member on the tie down strap, the hook comprising:
    a retaining bar for engaging the loop member of the tie down strap, the retaining bar being positioned at a first end of the hook;
    first and second opposing side members that extend from the retaining bar and which converge into first and second hook ends respectively, where the first and second hook ends are positioned at the second end of the hook and where the first and second opposing side members are angled to convergence at a point between the first and second ends of the hook to create a triangular shaped member with the retaining bar near their point of convergence and where, just before the point of convergence, the first and second opposing side members are angled upward and parallel to one another; and
    the first and second hook ends being separated from one another by a gap sufficient for permitting the threading of the loop member of the tie-down strap onto and off of the hook, the hook ends preventing the loop member from sliding off the hooks during operation.

2. The tie-down system of claim 1 where the strap loop of the strap is located on at least one end of the strap.

3. The tie-down system of claim 1 where the strap loop of the strap is located along the strap.

* * * * *